United States Patent
Elliott

(10) Patent No.: US 8,412,590 B2
(45) Date of Patent: Apr. 2, 2013

(54) IN-STORE WIRELESS SHOPPING NETWORK USING HAND-HELD DEVICES

(75) Inventor: Scott Elliott, Snoqualmie Pass, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 12/662,374

(22) Filed: Apr. 13, 2010

(65) Prior Publication Data

US 2010/0262554 A1 Oct. 14, 2010

Related U.S. Application Data

(60) Provisional application No. 61/168,895, filed on Apr. 13, 2009.

(51) Int. Cl.
*G06Q 30/00* (2006.01)

(52) U.S. Cl. ........................... 705/26.9; 705/27.1

(58) Field of Classification Search ........ 705/26.1–27.2, 705/26
See application file for complete search history.

(56) References Cited

U.S. PATENT DOCUMENTS

| | | | |
|---|---|---|---|
| 6,587,835 B1 | 7/2003 | Treyz et al. | |
| 6,716,103 B1 | 4/2004 | Eck et al. | |
| 7,149,549 B1 | 12/2006 | Ortiz et al. | |
| 7,275,994 B2 | 10/2007 | Eck et al. | |
| 7,347,780 B1 | 3/2008 | Best | |
| 7,376,388 B2 | 5/2008 | Ortiz et al. | |
| 7,394,457 B2 | 7/2008 | Adams et al. | |
| 7,762,458 B2 * | 7/2010 | Stawar et al. | 705/16 |
| 2002/0016734 A1 * | 2/2002 | McGill et al. | 705/14 |
| 2002/0049652 A1 * | 4/2002 | Moore et al. | 705/29 |
| 2002/0063799 A1 | 5/2002 | Ortiz et al. | |
| 2002/0178088 A1 | 11/2002 | Lurie et al. | |
| 2003/0112354 A1 | 6/2003 | Ortiz et al. | |
| 2003/0158796 A1 * | 8/2003 | Balent | 705/28 |
| 2004/0111320 A1 | 6/2004 | Schlieffers et al. | |
| 2004/0225540 A1 | 11/2004 | Waytena et al. | |
| 2004/0266409 A1 | 12/2004 | Nielsen et al. | |
| 2005/0233733 A1 | 10/2005 | Roundtree et al. | |
| 2006/0059049 A1 * | 3/2006 | Morris et al. | 705/26 |
| 2006/0148522 A1 | 7/2006 | Chipchase et al. | |
| 2006/0229099 A1 | 10/2006 | Chen et al. | |
| 2006/0258337 A1 | 11/2006 | Fujita et al. | |
| 2006/0265238 A1 | 11/2006 | Perrier et al. | |
| 2006/0270386 A1 | 11/2006 | Yu et al. | |
| 2006/0288375 A1 | 12/2006 | Ortiz et al. | |
| 2007/0121534 A1 | 5/2007 | James et al. | |
| 2007/0155406 A1 | 7/2007 | Dowling et al. | |

(Continued)

OTHER PUBLICATIONS

Business/Technology Editors, "Peapod Spin-off Split Pea Software Teams With HighPoint Systems to Offer Unique End-to-End Home Shopping Solution for Food Retailers," Business Wire, Feb. 22, 1999, p. 1.*

(Continued)

*Primary Examiner* — Brandy A Zukanovich
(74) *Attorney, Agent, or Firm* — Nixon & Vanderhye P.C.

(57) ABSTRACT

An example system includes a display, a communication circuit, a memory storing a shopping program, and a processor in communication with the display, the communication circuit and the memory. The processor is configured to execute the shopping program to access a product database including product information, to process inputs supplied to the system to generate a shopping list comprising one or more products from the product database and to provide guidance information on the display relating to product location in a store of the products on the shopping list.

13 Claims, 14 Drawing Sheets

U.S. PATENT DOCUMENTS

| | | | |
|---|---|---|---|
| 2007/0216783 A1 | 9/2007 | Ortiz et al. | |
| 2008/0016534 A1 | 1/2008 | Ortiz et al. | |
| 2008/0065768 A1 | 3/2008 | Ortiz et al. | |
| 2008/0119274 A1 | 5/2008 | Eck et al. | |
| 2008/0231431 A1* | 9/2008 | Stawar et al. | 340/425.5 |
| 2009/0106849 A1* | 4/2009 | Wu | 726/28 |

OTHER PUBLICATIONS

Search Report dated Dec. 9, 2010 in PCT Application PCT/US2010/001093.

Boyter, "Front Row takes a new look at the old ball game"; Dallas Forth Worth TechBiz; The News Source for Metroplex Technology Leaders; www.dfwtechbiz.com ; Jul. 16-22, 2001.

International Preliminary Report on Patentability issued for corresponding PCT Patent Application No. PCT/US2010/001093, dated Oct. 18, 2011.

Written Opinion of the International Searching Authority issued for corresponding PCT Patent Application No. PCT/US2010/001093. dated Dec. 9, 2010.

* cited by examiner

| 302 | 304 | 306 | 308 | 310 | 312 | 314 | 316 | 318 | 320 | 322 |
|---|---|---|---|---|---|---|---|---|---|---|
| ID | NAME | SUPPLIER | SIZE | PRICE | AVAILABILITY | IMAGE | LOCATION | NUTRITIONAL INFO | URL | RATING |

Planning
Number of persons

Adult 2
Children 2

Fig. 8B

Planning
Adult 1

Name:

Age:

Diet:

Dietary Restrictions:

Fig. 8C

Planning
Breakfast

[x] Cereal [7▼] Days — 804
[Rice Krispies ▼]

[ ] Eggs [0▼] Days — 804
[x] Toast [7▼] Days — 804
[1▼] Slice
[Butter ▼]
— 804
[x] Juice [7▼] Days
[Orange ▼]
— 804
[x] Hot Drink [7▼] Days
[Coffee ▼]

IN-STORE WIRELESS SHOPPING NETWORK USING HAND-HELD DEVICES

CROSS REFERENCE TO RELATED APPLICATION

This application claims the benefit of application No. 61/168,895, filed Apr. 13, 2009, the contents of which are incorporated herein in their entirety.

BACKGROUND AND SUMMARY

This application describes an in-store wireless user network for use with hand-held devices, particularly a network that can be used by shoppers at, for example, grocery stores.

An example system includes a display, a communication circuit, a memory storing a shopping program, and a processor in communication with the display, the communication circuit and the memory. The processor is configured to execute the shopping program to access a product database including product information, to process inputs supplied to the system to generate a shopping list comprising one or more products from the product database and to provide guidance information on the display relating to product location in a store of the products on the shopping list.

Another example system includes a display, a memory storing a shopping list program, and a processor in communication with the display and the memory. The processor is configured to execute the shopping program to receive inputs corresponding to meals for one or more persons and to process the received meal inputs to generate a shopping list for output on the display.

Another example system includes a display, a memory storing a shopping program, and a processor in communication with the display and the memory. The processor is configured to access multiple product databases each including product information for products of a different store, to compare prices for products on a shopping list at different stores using price information in the product databases for those stores, and to generate a display showing total prices of the products on the shopping list at each of the stores.

Another example system includes a display, a memory storing a shopping list program, a radio frequency identification (RFID) reader, and a processor in communication with the display, the memory and the RFID reader. The processor is configured to execute the shopping list program to transmit RFID interrogation signals using the RFID reader, to receive responses to the RFID interrogation signals and to process the responses to generate at least a partial shopping list for output on the display.

BRIEF DESCRIPTION OF THE DRAWINGS

FIGS. 8A-8C show example screens for inputting meal information in the shopping list mode.

DETAILED DESCRIPTION OF EXAMPLE EMBODIMENTS

The example embodiments described herein make use of a hand-held device that includes a display, input system (e.g., a touch screen), persistent memory, and wireless connectivity. By way of example, the hand-held device may be a mobile telephone, personal digital assistant (PDA), tablet computing device, hand-held video game system or any other type of mobile communication device.

Figure 1:
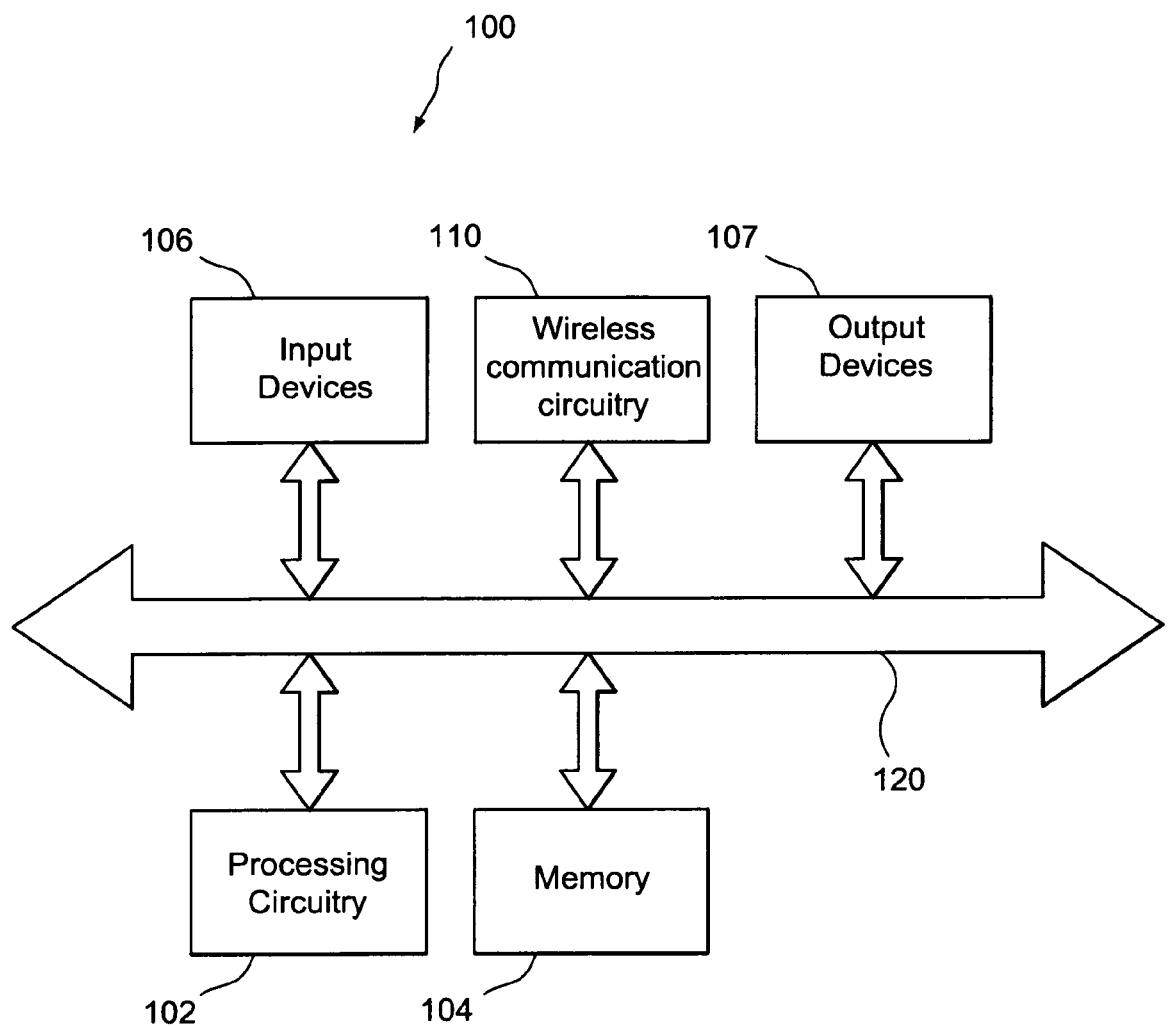
FIG. 1 is a generalized block diagram of an example hand-held device 100.

An example hand-held device 100 is generally arranged along the lines shown in FIG. 1. Example hand-held device 100 includes processing circuitry 102 connected to a system bus 120. Processing circuitry 102 controls the overall operation of the device. A memory 104 is accessible to the processing circuitry and stores operating programs (such as, for example, some or all of the shopping program described herein) and data used by the processing circuitry (such as, for example, a downloaded product list and a created shopping list as described herein) to effect the aforementioned control of overall device operation. Memory 104 may include read/write memory for storing data during device operation and read-only memory for storing operating programs. Memory 104 may include a combination of on-board and removable memory. The removable memory may be in the form of magnetic disks, memory cards, optical disks and the like. Input device(s) 106 such as one or more cameras, keys, a keypad, a touchpad, a remote control, a trackball, a mouse, a microphone, a touch-sensitive screen, switches, buttons and the like provide inputs to the processing circuitry 102. Output device(s) 107 such as one or more displays and one or more speakers provide visual and audio outputs, respectively. A vibration source may be included to provide tactile output. Wireless communication circuitry 110 enables wireless communication with wireless access points in accordance any conventional standard or proprietary protocol including, but not limited to, WiFi (e.g., 802.11, 802.11a, 802.11b, 802.11g and 802.11n), Bluetooth, and Global System for Mobile Communications (GSM).

For ease of illustration, the components shown in FIG. 1 are illustrated as being directly connected to system bus 120. It will be appreciated that appropriate interface circuits and/or controllers (not shown) may be provided.

Hand-held device 100 may be advantageously implemented as a game system such as the Nintendo DS or DSi game system. An example game system 200 is generally shown in FIGS. 2A-2D.

Figure 2A:
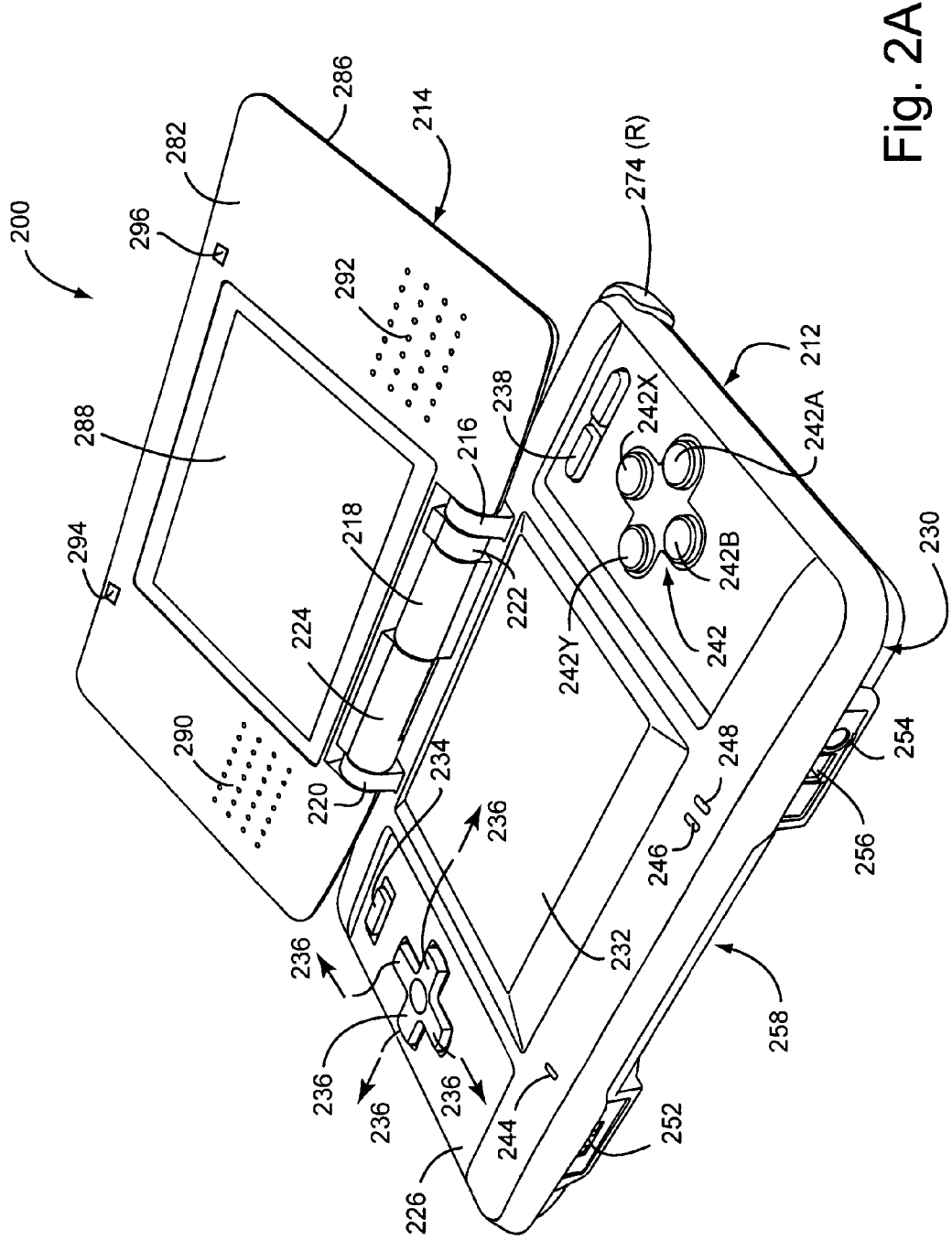
FIGS. 2A-2D show an illustrative game system which is an example of hand-held device 100.
Figure 2B:
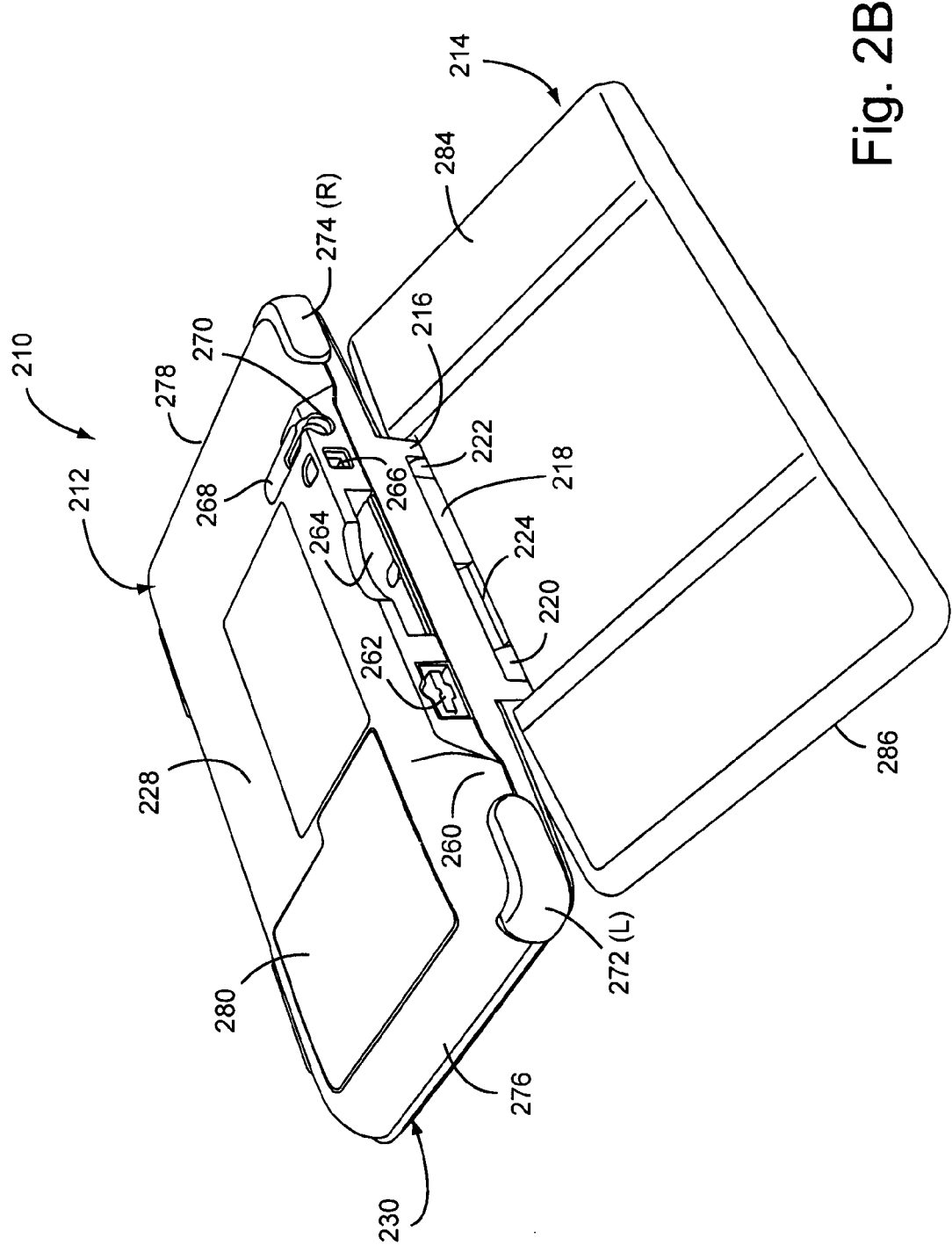

Referring to FIGS. 2A and 2B, example game system 200 includes a main body 212 and a cover body 214 hingedly connected to each other along an upper edge of the main body 212 and a lower edge of the cover body 214 (references herein to terms such as "upper" and "lower" and "forward" and "rearward" are for ease of understanding and are made relative to an orientation of the game system where the cover body 214 is in an open position and the game is being held by a user in a normal operating position). Hinge elements 216, 218 and 220 on the main body 212 mesh with hinge elements 222 and 224 on the cover body, with a hinge pin (not shown) extending through the aligned hinge elements in conventional fashion. Note that because hinge elements 216, 218 and 220 extend from the upper (or inner) face 226 of the main body 212, the cover body 214 overlies the upper face 226 when the cover body 214 is closed over the main body. When the cover body 214 is in its fully open position, it is substantially parallel to the main body 212, but lies in a substantially parallel, offset plane. The main body 212 also has a lower (or outer) face 228 (FIG. 2B) and a peripheral edge 230.

A first display screen 232 is recessed within the upper face 226 of the main body 212. The screen in the exemplary embodiment is a backlit, color liquid crystal display (LCD). This screen is touch-sensitive and may be activated by a stylus or a finger. A power button 234 is located in the upper left corner of face 226 and is used to turn the system on and off. A cross-shaped directional control button 236 is located adjacent and below the power button 234, and may be used for cursor control and program (e.g., game play) control, for example.

In the upper right corner of main body 212, there are side-by-side "start" and "select" buttons 238, 240, respectively, with X/Y/A/B buttons 242 (i.e., buttons 242X, 242Y, 242A and 242B) located adjacent and below the "start" and "select" buttons. Buttons 238, 240 and 242 are also used for program (e.g., game play) control, for example. A microphone 244 is located below the left edge of screen 232. A battery recharge indicator LED 246 and a power indicator LED 248 are also located on upper face 226, adjacent the lower edge thereof, below the right edge of screen 232.

Figure 2C:
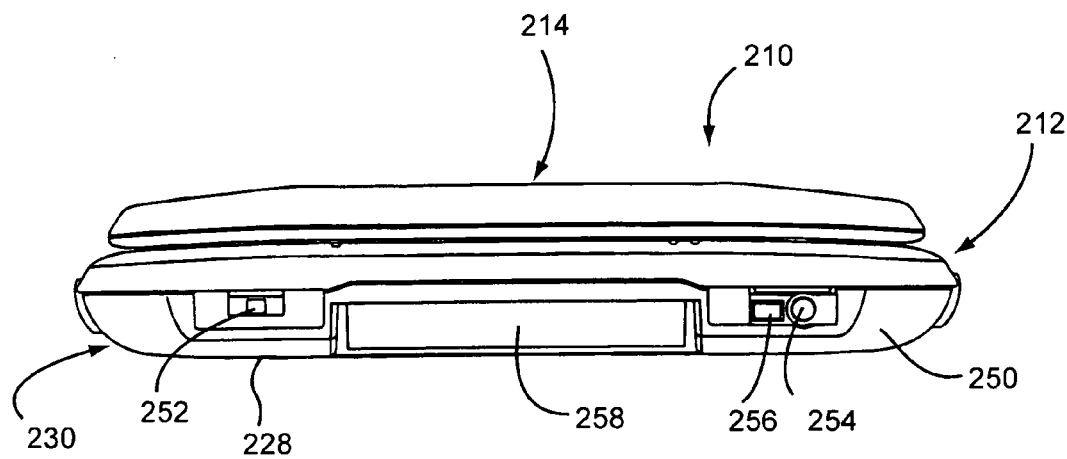
Figure 2D:
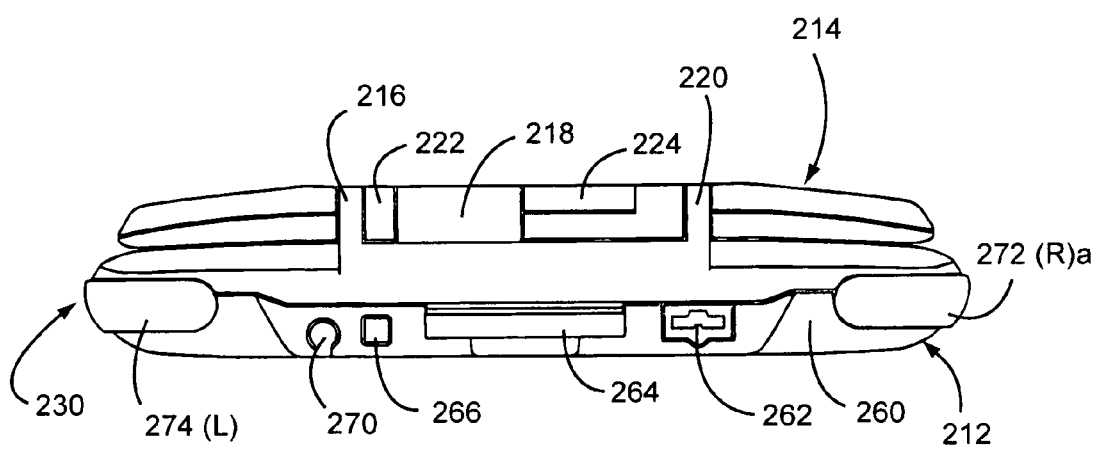

With reference now especially to FIG. 2C, a lower or forward portion 250 of peripheral edge 230 (closest to the user) is provided with a volume control slide 252 and headphone and microphone connectors 254, 256 on either side of a first card slot 258. Slot 258 is especially designed for larger memory cartridges such as game cards originally designed for use with the assignee's Game Boy Advance® game system. Although example game system 200 is shown as including slot 258, this slot may be omitted or a slot of different size and type (e.g., for receiving secure digital (SD) memory cards) may be provided.

As best seen in FIG. 2B, an upper or rearward portion 260 of peripheral edge 230 is provided with an external extension connector 262 that permits connection to an AC adapter for recharging the internal battery (not shown), or for operating the game using household power. A second card slot 264 in edge portion 260 is designed for receiving memory or game cards. The second game slot 264 is smaller than the first game slot 258, reflecting the different sizes of the cards received therein. Openings 266, 268 form an elbow-shaped through slot adapted for securing a wrist strap (not shown). A stylus port or holder, in the form of a blind bore 270 is located adjacent the wrist-strap mount for holding a stylus before or after use.

A pair of left, right control buttons (or shoulder buttons) 272L, 274R are located on peripheral edge 230, at the corners where the upper portion 260 of peripheral edge 230 meets side portions 276, 278 of the peripheral edge. The location of these buttons and the location of previously described buttons 234, 236 and 242 facilitate manipulation by the user's thumbs and index fingers when the device is held with two hands in a natural and intuitive manner.

The lower (or outer) face 228 of the main body is provided with a battery cover 280 (FIG. 2B) for accessing a rechargeable battery pack located within the main body.

The cover body 214 also has an upper (or inner) face 282 (FIG. 2A) and a lower (or outer) face 284 (FIG. 2B) connected by a peripheral edge 286. The upper face 260 incorporates a second display screen 288 of substantially the same dimensions as screen 232. Screen 288 is also a backlit color LCD. Cover body 214 also incorporates a pair of stereo speakers, with speaker grills 290, 292 located on opposite sides of the screen 288. Dimples or pads 294, 296 may be located above and laterally of screen 288. The dimples may be made of a compressible polymer or other suitable material and serve to dampen engagement of the inner surface 282 of cover body 214 with the inner surface 226 of main body 212 when the cover body is closed over the main body.

Additional details of example game system 200 are set forth in U.S. Patent Publication No. 2007/0121534 (application Ser. No. 11/507,019, filed Aug. 21, 2006), the contents of which are incorporated herein in their entirety.

One particular advantage of using such a game system as a hand-held device in the systems and methods described herein is that there is a large installed base of users each of whom has a device with the same hardware characteristics. Because the systems and methods can therefore be designed for a single hardware platform with a large installed base, overall design is simplified. Of course, it will be recognized that the systems and methods described herein can be readily applied to a wide variety of computing platforms and thus these systems and methods are in no way limited, either expressly or impliedly, to the example game system discussed above.

A shopping program described below is an example of content that may be loaded on to hand-held device 100. This shopping program provides, among other things, shopping list capabilities. The shopping program may be loaded onto hand-held device 100, for example, via a download (e.g., a wireless download) from a server or via a removable memory card. In another example implementation, hand-held device 100 may be pre-configured for sale to shoppers with the shopping program in on-board memory.

In the non-limiting example described below, the shopping program is designed for groceries. Of course, it will be recognized the program may be readily adapted for other types of shopping (e.g., for clothes, cars, boats, appliances, electronics, furniture, houses, real estate, etc.).

The example shopping program utilizes product lists (obtained by downloading or otherwise) that are tailored to particular stores. In the case of groceries, the stores may include, for example, Giant, Harris Teeter, Safeway, Trader Joe's, Whole Foods and the like. Such a product list includes, for example, all of the standard product offerings of a store. The product list may be specific to a particular store location (e.g., store at 123 Main Street, Anytown, USA) or may be a generic list common to multiple different store locations (e.g., all stores in state XX or all stores in county YY).

The product list may include some or all of the information in a product database stored in memory of a server which is accessed by hand-held device 100 over the internet, for example.

Figure 5A:
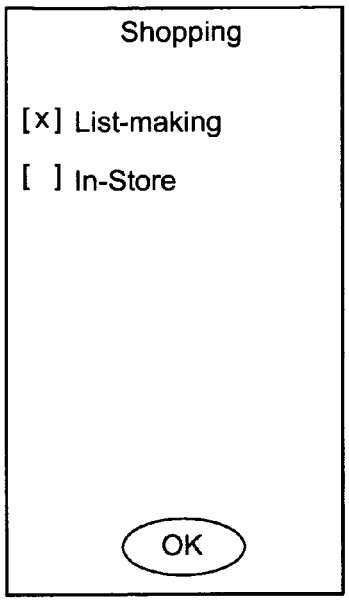
FIGS. 5A-5G show various example screens for a shopping list mode of an example shopping program.
Figures 1, 5B:
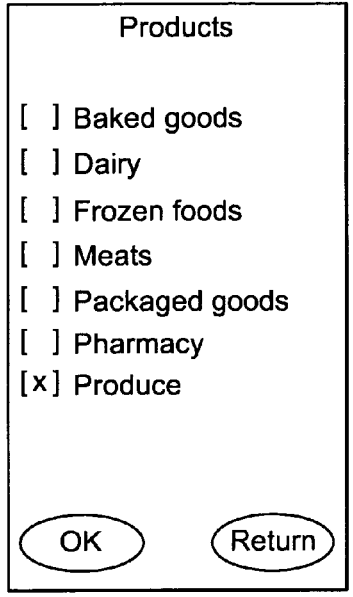
Figures 2, 5B:
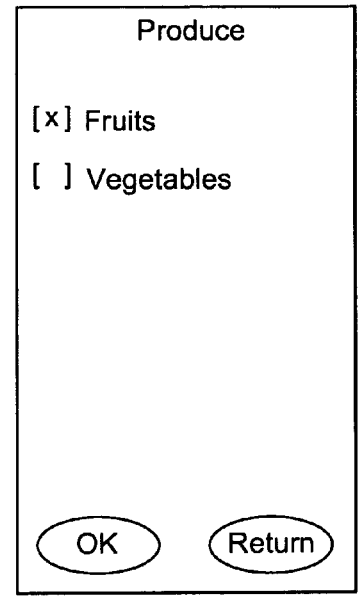
Figures 3, 5B:
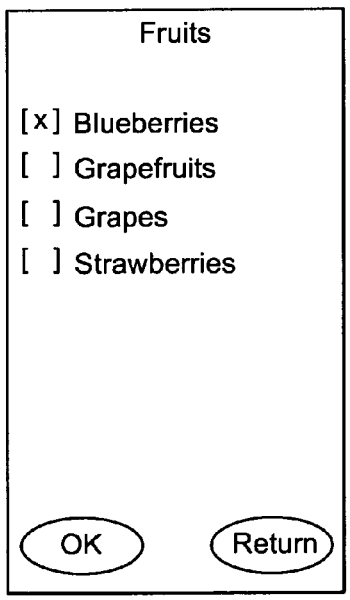
FIG. 3 shows example fields for a product database.
Figures 4, 5B:
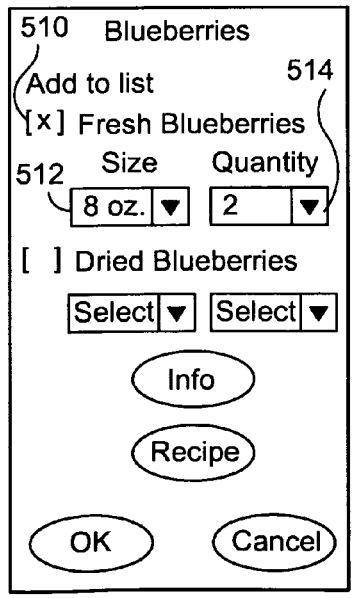

An example product database record is shown in FIG. 3 and includes the following fields: product identifier, product name, product supplier/manufacturer, product size, product price, product availability, product image, product store location, product nutritional information, uniform resource locator (URL) for additional information about the product, and product rating.

The arrangement of the various fields in FIG. 3 is by way of example only and the actual database may be made up of some or all the above-mentioned fields and/or additional fields, which may be organized into one or more tables.

The product identifier field 302 may include an alphanumeric character for identifying the record number of the record in the database containing information about a particular product. The product name field 304 may include the name of the product (e.g., salt, yogurt, chicken breast, etc.). The product supplier/manufacturer field 306 may include the name of the supplier of the product (e.g., Morton, Yoplait, Perdue, etc.). The product size field 308 may contain the amount or quantity of the product as packaged for sale (e.g., 24 ounces, six 4-ounce containers, two pounds, etc.). The product price field 310 may include information about the cost of the product (e.g., $1.09, $3.19, $4.50/lb, etc.) as packaged for sale. The product availability field 312 includes information indicating whether a product is in stock/not in stock. The product image field 314 may include an image of the product, for example, in its packaging. The product store location field 316 includes information indicating where the product is located in the store (e.g., middle of aisle 2, second shelf, etc.). The product nutritional information field 318 includes nutritional information such as, but not limited to, per serving information about number of calories, amount of fat, amount of cholesterol, amount of sodium, amounts of various vitamins and minerals and the like. The uniform resource locator field 320 may include an URL for a webpage maintained by the supplier/manufacturer which provides additional information about the product. The product rating field 322 may include ratings (e.g., numeric or a number of stars) for a product along with comments about the product. These ratings may be derived, for example, from shopper submissions.

Of course, other product information (e.g., whether a product is on special or on sale) may be included in the database and the systems and methods described herein are not in any way limited to any or all of the specific fields of product information identified above.

Figure 4:
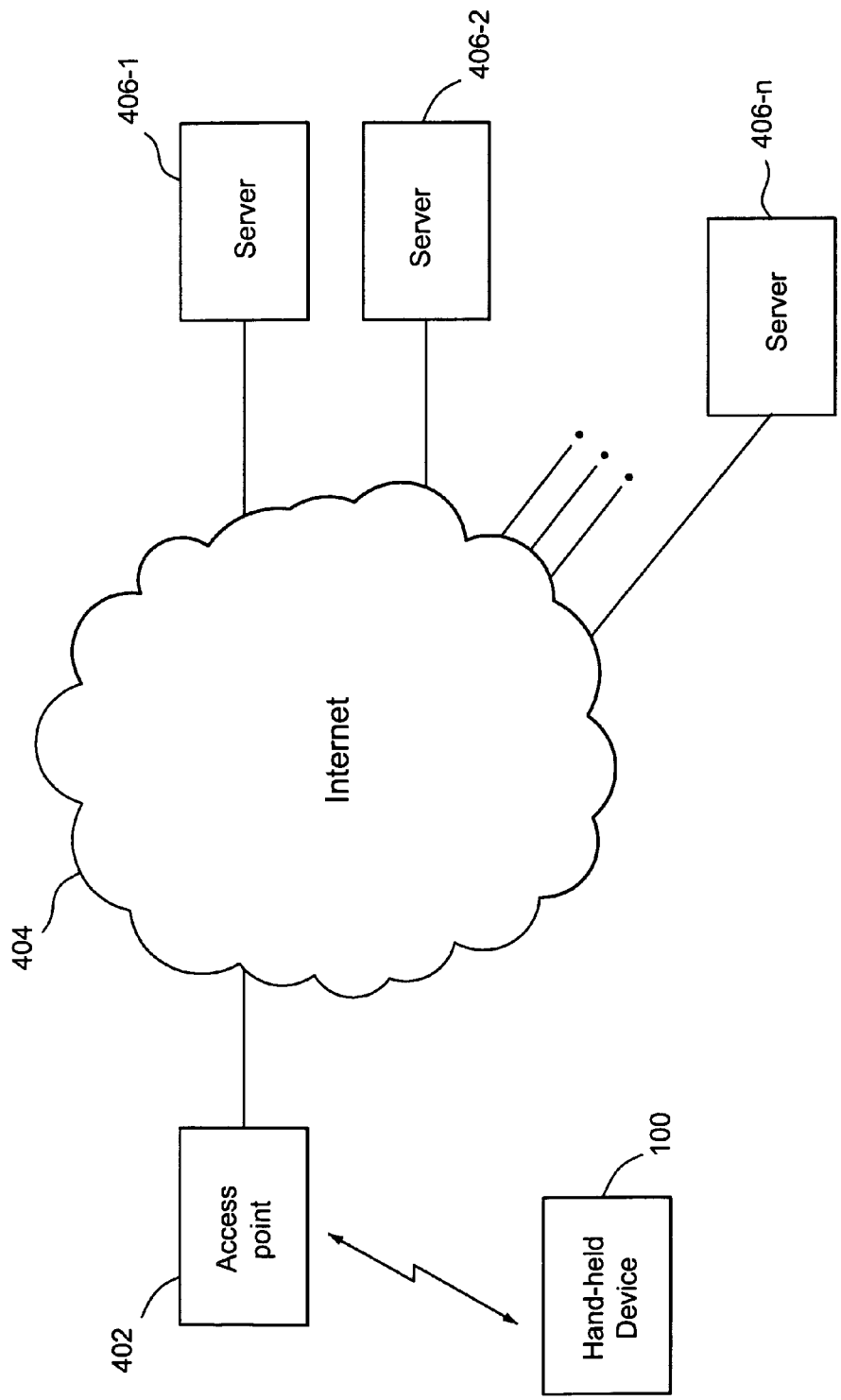
FIG. 4 shows a communication system allowing hand-held device 100 to communicate with one or more store servers 406.

With reference to FIG. 4, hand-held device 100 may connect wirelessly (e.g., using a WiFi connection) with a wireless access point 402 which may, for example, be in a shopper's home or workplace. Wireless access point 402 may be connected to or include a DSL or cable modem (not shown) to provide access to the internet 404. Various servers 406-1, 406-2 . . . 406-n are connected to the internet 404. These servers may, for example, be respectively associated with a particular store, multiple stores of the same or different chains, all stores of a particular chain, etc. In an example system, these servers are web servers that provide content (e.g., web pages) in accordance with the HTTP protocol. When the shopping program is running on hand-held device 100, hand-held device 100 may connect to one of these servers (e.g., by using an appropriate uniform resource locator (URL)). Once connected, a product list may be downloaded in response to appropriate inputs (e.g., menu selections, link selections, etc.) supplied to the hand-held device (e.g., by gestures or touches to a touch-sensitive display screen). The downloaded product list is stored in memory 104.

The downloaded product list may include, for example, some or all of the database fields for some or all of the products in the product database shown in FIG. 3. The downloaded list (or portions thereof) may be output via a display and/or speakers of hand-held device 100. As explained in greater detail below, a user may select products, quantities, etc. from the downloaded product list to generate a shopping list, which may also be stored in memory 104. The shopping list, or portions thereof, may be uploaded to the server for the corresponding store, if desired.

The shopping program may include an options menu that allows a shopper to specify which product information fields and which products types are included in downloaded product lists. For example, vegetarians may use the options menu to configure the hand-held device not to download product information about meat products.

Of course, in other example implementations, the product list need not be downloaded to hand-held device 100. The product list for a particular store may be maintained on a corresponding server and be presented as web pages on the display of hand-held device 100 when the hand-held device connects to the server. The shopper may make selections (e.g., product and quantity/amount) from the displayed product list to generate a shopping list which is then stored in one or both of memory of the server and memory 104 of hand-held device 100.

When a shopper initially accesses a server for a particular store, the shopper may be requested to provide certain identifying and contact information (e.g., name, post office address, telephone number, email address) to identify the shopper and/or to link the shopper's shopping list to one or more of a credit card, charge card, check card, affinity card or shopper "bonus" card. Such linking can facilitate check-out, for example, by simplifying the submission of the grocery charges to an appropriate entity upon verification of the charge amount by the shopper. The store may use the contact information to contact the shopper, for example, over the telephone, via email or through regular mail. The shopper may be provided with options for limiting the manner in which and/or the times at which he/she may be contacted.

An example shopping program described herein includes at least two modes. The first mode is a list-making (or planning) mode and the second mode is an in-store (or shopping) mode.

Figure 10A:
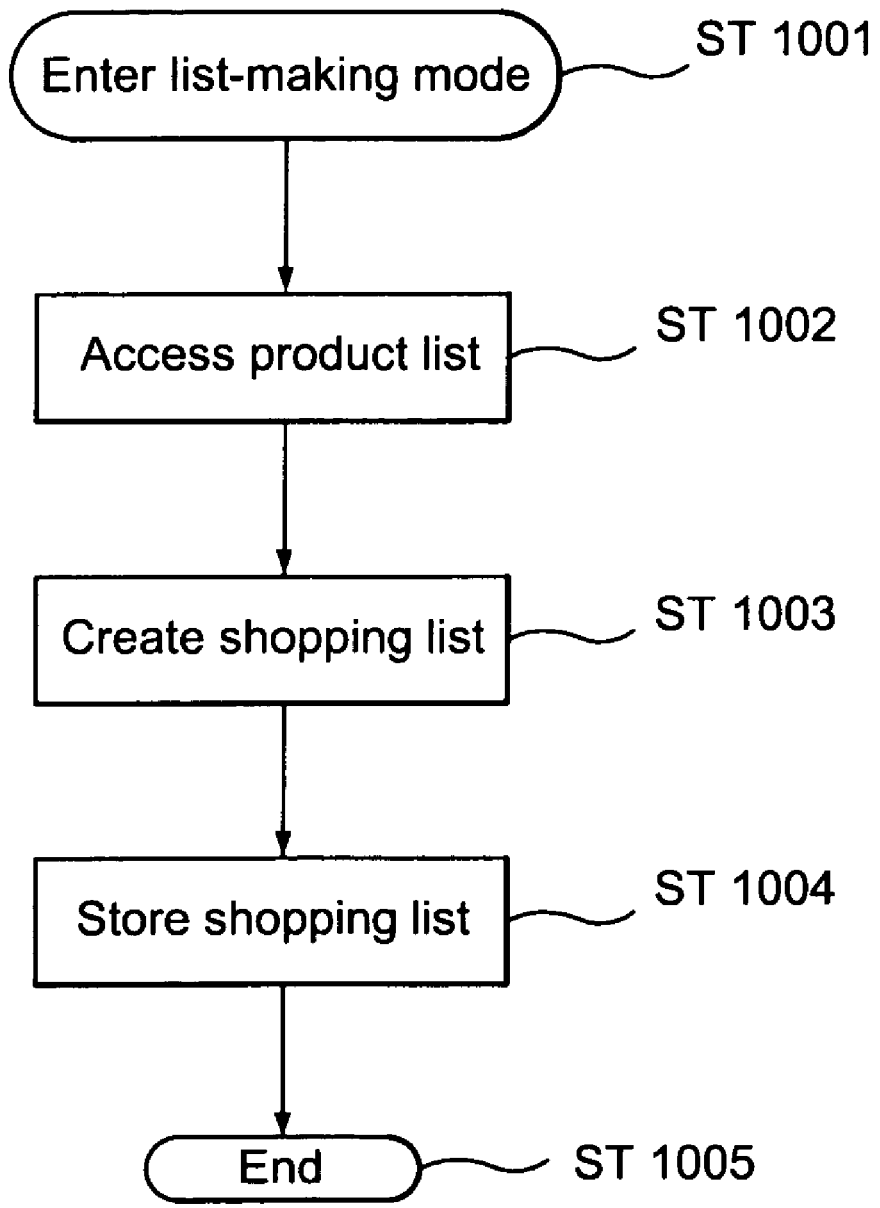
FIGS. 10A and 10B are flow charts showing example steps in list-making and in-store modes.

FIG. 10A is a flow chart showing generalized steps in an example list-making mode. The process starts at ST 1001 by entering the list-making mode. This mode may be entered, for example, by selecting a "List-Making" option from a menu displayed on hand-held device 100 when the shopping program is running. At ST 1002, a product list is accessed, for example, by connecting to a store web server. Access to some or all of the product list information may require entry of an appropriate password. The accessed product list may be downloaded to hand-held device 100 or utilized while stored on the web server. At ST 1003, a shopping list is created. This list may be created, for example, by selecting one or more products from the product list. At ST 1004, the shopping list is stored for subsequent use in the shopping mode. The list may be stored on hand-held device 100 or on the store's web server. The list-making mode then ends (ST 1005).

Figure 10B:
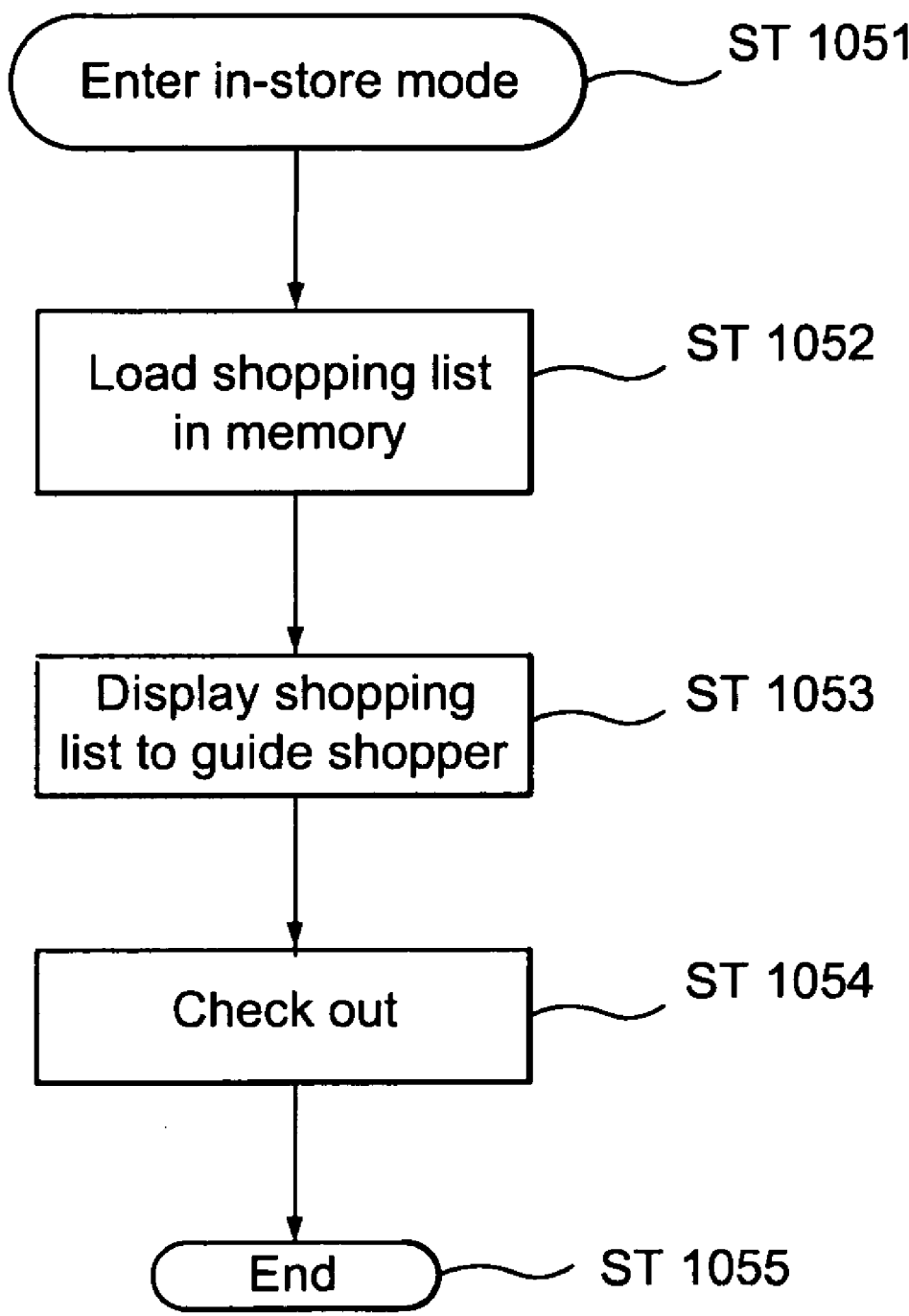

FIG. 10B is a flow chart showing generalized steps an example in-store mode. The process starts at ST 1051 by entering the in-store mode. This mode may be entered by, for example, selecting an "In-Store" option from a menu displayed on hand-held device 100 while the shopping program is running or automatically when a shopper enters a store. At ST 1052, the shopping list for the store at which the shopper is shopping is loaded into memory of hand-held device 100. This may be done by selecting a shopping list from a menu of shopping lists or automatically using, for example, store identification information communicated to hand-held device 100 when the shopper enters a store and connects to an in-store wireless network. At ST 1053, a shopping list display is presented to the shopper. The products on the shopping list may, for example, be conveniently ordered for display in an order corresponding to an order in which the products are encountered or found in the store when the shopper begins shopping at a specified location (e.g., aisle 1) so that the shopper can be guided during shopping. After shopping, there is a check-out procedure at ST 1054 (which may include, for example, charging the payment amount for the groceries to a shopper-designated credit, charge or debit card) and the in-store mode then ends at ST 1055.

As mentioned above, selection of a particular mode may be made by supplying a suitable gesture or touch to a touch-sensitive display screen of hand-held device 100. An example of such a screen is shown in FIG. 5A and includes menu options labeled "List-Making" and "In-Store." Selecting the "List-Making" option with a stylus or finger and then selecting the "OK" button causes the program to enter the list-making mode. Selecting the "In-Store" option and then selecting the "OK" button causes the program to enter the in-store mode. It is also possible for the program to automatically enter one or both of these modes. For example, if hand-held device 100 is configured to determine its location (e.g., using GPS data) and it determines that it is located in a store, the program may automatically enter the in-store mode appropriate for that store.

Of course, inputs to hand-held device 100 are not limited to touch-screen inputs and may alternatively or additionally include positioning a cursor using a trackball or a cross-switch and then pressing an enter button, for example.

The list-making mode is typically (although of course not always) activated outside a store in a location such as a shopper's home or workplace. In this mode, a shopper may create a shopping list by making selections from the product list for a particular store. In the list-making mode, the entire product list is accessible and the program provides a shopper with options to indicate, for example, the quantity and amount needed of a particular product. The product list can be selectively displayed in one or more of a hierarchical display, a most common items display, by frequency of purchasing, alphabetical order, a promotional order selected by the store, or by location (e.g., aisle) within the store.

FIG. 5B-1 shows a non-limiting example hierarchical list in which a first level of menus allows a shopper to choose from among product types such as Baked Goods, Dairy, Frozen Foods, Meats, Packaged Goods, Pharmacy, and Produce. This hierarchical list is provided by way of example only and it will be readily apparently that hierarchical lists with more, fewer or different product types may be utilized.

Touching one of these product types with a stylus or finger and then touching the OK button results in display of a corresponding second level menu, such as that shown in FIG. 5B-2, which results from touching the Produce option from the list of FIG. 5B-1. Selecting Fruits from the second level menu of FIG. 5B-2 and then pressing the OK button results in display of a third level menu such as that shown in FIG. 5B-3.

With reference to FIG. 5B-3, selecting Blueberries and then pressing the OK button results in display of a screen such as that shown in FIG. 5B-4 which allows selection from between Fresh Blueberries and Dried Blueberries and specification of an amount and quantity. By "checking" the "add to list" check box 510 and making appropriate selections from the pull-down menus 512 and 514, two (2) eight (8) ounce packages of Fresh Blueberries may be added to the shopping list.

A shopping list may be generated by making one or more product selections from a menu system developed along the lines described above.

Figure 5C:
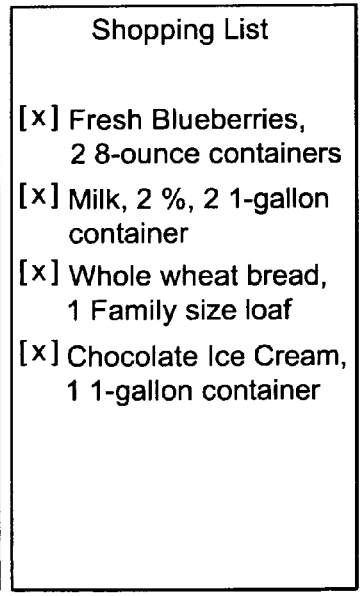

Preferably, some or all of the menu screens in the list-making mode include a "Show Shopping List" button (not shown) that enables immediate display of the products currently contained on the shopping list such as shown in FIG. 5C. This shopping list display may allow, among other things, deletions from the list or modifications to the currently specified amount and/or quantity.

Of course, the systems and methods described herein are not limited to the particular menus shown in FIGS. 5B-1 through 5B-4 and the illustrated menus are provided only by way of example and not by way of limitation. In particular, the example menus herein are merely intended to provide an understanding of certain basic functionality. The actual menus in the program interface may be much more sophisticated and include graphics, images, video and audio features. Thus, for example, although not shown in FIGS. 5B-3 and 5B-4, images of the fruits and vegetables may be provided on the menus to assist a user in making selections. Similar images may be provided for displays associated with other products on the product list.

The program will, if enabled by the user (e.g., by an appropriate setting in an options menu), update the product list stored in memory 104 to reflect changes made to product list on a store's server. For example, the program may be configured with appropriate program instructions so that when it is activated and placed in the list-making mode, hand-held device 100 automatically connects to a store's server (e.g., using an appropriate URL) to obtain any product list updates (e.g., new products, price changes, products no longer available, changes to available quantities and amounts such as a product that is now only available in 8 and 16 ounce sizes—a 12 ounce size is no longer available). If multiple product lists are stored in memory 104, hand-held device 100 may connect sequentially to the servers for the stores corresponding to these lists. The updating of product lists may occur in the background while a shopper is otherwise using the shopping program. Alternatively, use of the program may be disabled pending the update. In this case, the shopper may be provided with a message to this effect along with an estimated time until the updating is completed.

In addition to simply displaying products to enable selection of the products for inclusion on a shopping list, the shopping program may be configured to enable viewing of additional information about an item such as nutritional information or recipes.

Figure 5D:
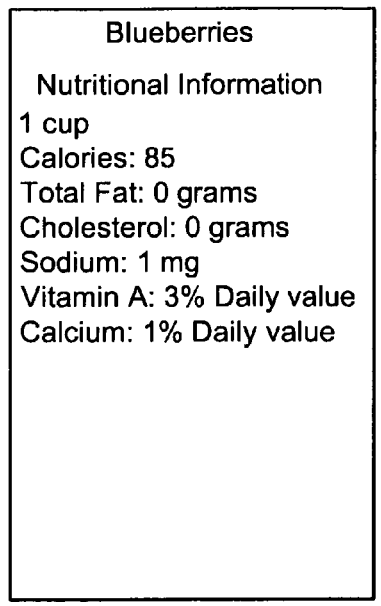

Thus, in FIG. 5B-4, touching the Info button when Fresh Blueberries is highlighted or otherwise designated can provide a display of the nutritional content of blueberries as shown in FIG. 5D which displays caloric, fat, cholesterol, sodium and vitamin information. The display may also include general information (not shown) indicating that blueberries are a good source of vitamins A, C and E and potassium and provide a link which can be selected by the shopper to receive even more nutritional information (including audio or video information) about blueberries.

Figure 5E:
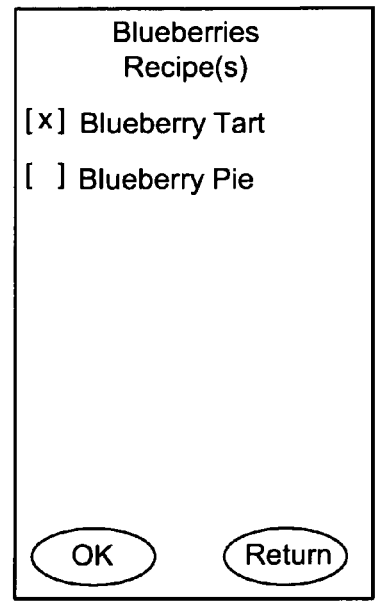
Figure 5F:
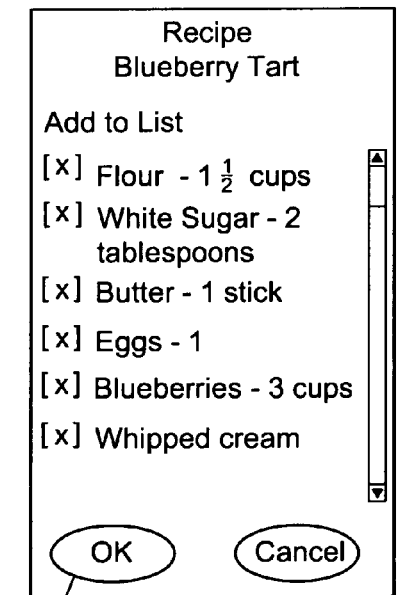

If the Recipe button is touched when Fresh Blueberries is highlighted or otherwise designated on the screen of FIG. 5B-4, a blueberry recipe list is displayed as shown in FIG. 5E. The screen of FIG. 5E shows a recipe list including Blueberry Tart and Blueberry Pie. If Blueberry Tart is selected, a recipe is shown as in FIG. 5F which identifies ingredients (such as flour, salt, sugar, whipped cream, blueberries, etc.) and ingredient quantities/amounts. FIG. 5F shows only part of the recipe and it will be apparent that other ingredients and the steps for making the blueberry tart (e.g., how to combine the ingredients, cooking instructions, garnishing instructions, etc.) may be presented on another part of the same page (which may be accessed by scrolling, for example) or on another page.

The display of FIG. 5F permits the ingredients identified in the recipe to be automatically added to the shopper's shopping list. As shown in FIG. 5F, the identified ingredients in the blueberry tart recipe have the corresponding "add to list" check box checked. In this case, if the user touches the OK button, the ingredients for the recipe are added to the shopping list. The user has an opportunity to uncheck one or more of the check boxes (e.g., by touching the ingredient listing or the check box for the ingredient listing) before selecting the OK button. In this case, the ingredients for which the corresponding "add to list" check box is unchecked will not be added to the shopping list when the OK button is touched.

In some implementations, the shopping program may be configured to initially display "common" household items (e.g., salt, sugar, and flour) in the ingredient list of FIG. 5F with the "add to list" check box initially unchecked because it is likely that many shoppers will already have such items at home and therefore will not need to add such items to the shopping list.

The shopping program may be configured to allow the shopper to customize recipes built-in to the program, to customize and/or save recipes available on the store's server, or to add the shopper's own recipes. The shopper may associate one or more tags with an added recipe. For example, the tags "blueberry" and "tart" may be associated with a recipe for a blueberry tart so that the recipe will appear in recipe lists relating to both blueberries and tarts.

The recipes available on the store's server may be periodically changed in accordance with season, product (ingredient) availability and store promotions.

The product lists can also be arranged to provide brand specific choices or generic choices, such as Morton (registered trademark) salt or simply salt. The brand information can be provided for display, for example, using information in the supplier/manufacturer field of the product database.

The product list from a store can also include information indicative of whether a particular product has limited availability or is likely to be out of stock (e.g., live lobster, a particular type of wine). This product availability information can be provided for display, for example, using information in the product availability field of the product database.

The program can also be configured to allow a shopper to reserve certain products for particular items or make special orders for products (e.g., for products that may not be currently available). Thus, a shopper may make a special order for fresh lobster. The store's server computer can be programmed to communicate with the shopper when the product becomes available. This communication may be made via email if the shopper's email address is available or may be provided as a pop-up on the display of hand-held device 100 the next time the hand-held device connects to the server.

The program can also be configured to enable shoppers to place special orders such as party platters, cakes, and the like.

Shoppers can create their own custom lists for stores that do not maintain a server or do not publish a product list on the server. Such a custom list may be generated using a default product list included with or accessible to the shopping program.

Figure 5G:
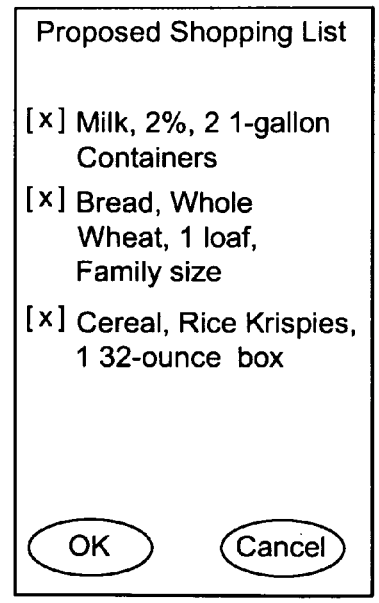

The shopping program may also be configured to initially provide a proposed shopping list for products that a user commonly purchases on a recurring basis. For example, the program may display a list as shown in FIG. 5G which includes products which a user purchases on most, if not all, visits to the store. This list may include milk, bread, cereal and the like. The list may be initially displayed with the "add to list" check box for these products checked and, in response to selection of the OK button, these products may be automatically added to the shopping list.

The packaging of more and more products includes so-called radio frequency identification (RFID) tags (e.g., passive RID tags). Such tags can be used to track the contents of a shopper's home refrigerator or shelves using periodic interrogations. Generally speaking, the RFID tag stores information including product identification information and other product information. The tag includes an antenna that receives an interrogation signal from an RFID reader's antenna. Using power derived from the interrogation signal, the passive tag sends a response signal back to the reader. This response signal may include some or all of the information stored in the tag.

Hand-held device 100 may be used as an RFID reader or another appliance in a shopper's house (e.g., a refrigerator) may include such a reader. The reader may periodically issue interrogation signals to determine which products are currently in a shopper's refrigerator or on the shopper's shelves. The interrogation signals may be issued at specified time intervals (e.g., once every two days, once a week, etc.) or may be issued when a shopper initiates the shopping program to create a shopping list. If hand-held device 100 is used as the RFID reader, then the interrogation signals may be sent by the hand-held device itself. If some other appliance or device contains the RFID reader, hand-held device 100 may send a command to this appliance or device to initiate sending of interrogation signals by the RFID reader of the appliance or device. The appliance or device may then forward the results of the interrogations to the hand-held device. The communication between hand-held device 100 and the appliance or device may be, for example, via a direct connection (e.g., a Bluetooth wireless link) or over an in-home wireless network to which both the hand-held device and the appliance or device are connected.

The results of the interrogations may be used by the shopping program to generate proposed products to be added to the shopping list. The proposed products may be based on the quantity of a particular product in the shopper's home or the time that a particular product has been in the shopper's refrigerator or on the shopper's shelves. For example, if the interrogation results indicate that only a single half-gallon of milk remains, the shopping program may propose that milk be added to the shopping list.

The interrogation results may also be used by the program to provide reminders that certain products may be nearing an expiration date or a "use by" date. For example, if the interrogation results indicate that a particular milk container has been in the refrigerator for two weeks, the shopping program may generate a reminder message to this effect that is displayed when the program is started. Similarly, if a meat product (e.g., beef, pork or chicken) has been in the refrigerator or freezer for a period of time approaching a "use by" date for such products, the program may generate a reminder message to this effect. In some implementations, the program may be configured to suggest a recipe calling for a product (or products) that may be approaching a "use by" date.

The program may also use the interrogation results to suggest recipes based upon ingredients which are determined to be present.

After a shopping list is generated, it is stored in the memory of hand-held device 100 for subsequent in-store use. Alternatively or in addition, the shopping list may be uploaded to the store's server for storage in memory.

The program may be configured to provide a total price for products currently on the shopping list. In some example implementations, the program can be configured to determine if better prices are available for the products on the shopping list. For example, the program can access product databases for other grocery stores (e.g., using an URL) and compare prices for the products on the shopping list. The program can use results of the comparing to inform the shopper which products on the shopping list are available for a lower price at another store. The program can also use results of the comparing to determine at which store the products on the shopping list can be obtained for the lowest total cost.

In performing such comparing, it may be that another store does not carry the same brand or package sizes of one or more products on the shopping list. In this case, the program can perform the comparing by considering the price of a comparable substitute for the unavailable product (e.g., a house brand instead of a national brand; two 18 ounce boxes of cereal instead of a 32 ounce box of cereal; and the like).

The program can also be configured to develop meal plans and initial shopping lists based on information supplied thereto via a shopper. Such information can include some or all of the number of persons for whom the shopping is done, the ages of those persons (or some similar information such as two adults, two children), information about what those person typically eat at different meals, any dietary restrictions, and the like. By way of example and without limitation, the program can present a series of display screens requesting input of such information.

FIGS. 8A-8C show example display screens requesting input that can be used to generate meal plans and initial shopping lists. The screen of FIG. 8A requests input of a number of adults and a number of children for whom groceries are generally purchased. For each person, a screen such as shown in FIG. 8B may be used to input information such as the name, age dietary restrictions (e.g., low sodium, low fat, gluten free, vegetarian, etc.) and other information for that person.

For each person, a screen like that shown in FIG. 8C can be used to input a typical breakfast meal for that person. For example, the FIG. 8C screen shows that the person typically has a bowl of cereal (Rice Krispies—registered trademark), a piece of buttered toast, a glass of orange juice and a cup of instant coffee. Another screen (not shown) may show that another person has two scrambled eggs with two slices of bacon twice a week, frozen waffles one day a week and a bowl of cereal (Wheaties—registered trademark) on the other days. On each day, the other person has a glass of orange juice and a cup of black tea.

Because people do not always eat the same food every day for breakfast, the screen of FIG. 8C includes drop-down edit boxes 804 that can be used indicate how many days a week a person typically has a particular food.

Similar screens may be used to provide inputs of a typical lunch for each person. For example a screen associated with lunch may reflect that the person has a sandwich with turkey and Swiss cheese two days a week; a sandwich with roast beef and provolone cheese two days a week; and a grilled cheese sandwich (American cheese) on the remaining days. The person also has either potato chips or pretzels with the sandwich along with two or three cookies (Oreos or Chips Ahoy). The person drinks unsweetened iced tea with lunch.

It is often the case that multiple persons will eat dinner together. Consequently, the example program may be configured to allow the shopper to enter the ingredients (and quantities of the ingredients) used for meals that the shopper commonly prepares for dinner. The ingredients may be selected by making selections from the product list or by selecting recipes for the meals. The shopper may also input a frequency for the dinners. For example, some dinners may be prepared once a week, others once every two weeks, etc.

The shopping program may be configured to use this information to calculate the types and amounts of groceries needed. For example, the program can calculate the amount of bread needed per week by adding up the slices of bread required for the number of sandwiches, pieces of toast and dinner recipes for a given week. The shopping program can use this calculated amount to generate an initial shopping list entry for bread including type and amount. Similar calculations can be performed for other products included in the input meal information.

Based on these calculations, the program can propose one or more of, for example, a weekly meal plan for one or more meals (i.e. breakfast, lunch or dinner) and a shopping list to the shopper. The shopper can accept the proposals or make modifications as desired.

The program can also be configured to process nutritional information associated with the input meal information to determine whether, for example, the overall meal plan may be high in sodium, high in fat, does not include enough vegetables and fruit, and the like. The program can be further configured to display suggested substitute ingredients or alternate meals to reduce the amount of sodium or fat, for example, in a person's diet.

When a user enters a store with hand-held device 100, the hand-held device is placed into the in-store mode. Device 100 may be placed in this mode automatically (e.g., in response to a mode instruction signal received when the device connects to an in-store wireless network) or manually (e.g., in response to a gesture or touch supplied to a touch screen of the device).

In the in-store mode, hand-held device 100 may transmit the shopping list to the store's server. The server may compare the shopping list to the current version of the product database and provide updates to the product information in the shopper's shopping list. For example, if the price of a particular product has changed, the price information for that product is updated in the shopper's shopping list. Similarly, if a product on the shopping list is now unavailable, the list can be updated with this information. The shopping list with the updated product information can be communicated back to the shopper's hand-held device 100 and stored in memory 104.

In addition, the store's server can process the shopping list information communicated thereto to provide the shopper with information about any sales or specials that may be available. For example, if the shopping list includes one package of blueberries, the shopper may be advised of a special price for two packages of blueberries. In this case, the display of hand-held device 100 may show a display allowing the shopper to modify the shopping list to include two packages of blueberries. The display may also include an option allowing the shopper to decline to modify the shopping list.

The server may also process the shopping list transmitted thereto to identify any special orders contained in the list. This information allows the server to provide notification to the store's staff (e.g., by an announcement over an in-store loudspeaker or by email or instant message to one or more staff members) of the shopper's arrival in the store and allows the store staff to bring the special order to the check-out area, thereby enhancing the shopper's experience.

Figure 7:
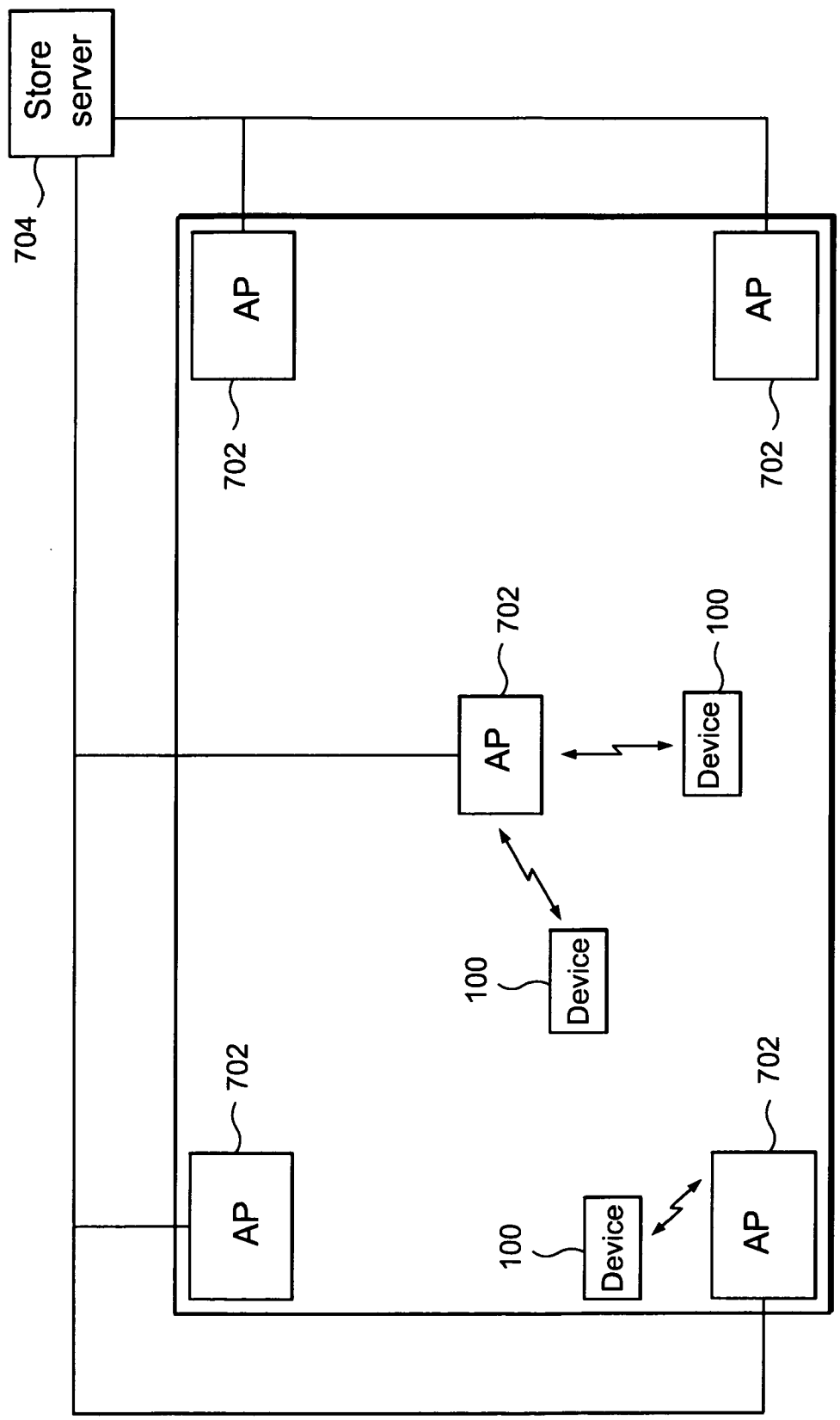
FIG. 7 shows an example in-store communication network.

As shown in FIG. 7, in the store, hand-held device 100 can connect to store server 704 via wireless access points 702. Although FIG. 7 shows a wired connection between wireless access points 702 and server computer 704, the connection between some or all of the wireless access points and the store server may be wireless. Store server 702 may be the same server as that discussed above from which the product list may be downloaded or store server 702 may be a different server. Access points 702 are distributed throughout the store and the number and positioning of the access points will vary based on the size and configuration of the store's retail space. As the shopper moves throughout the store, hand-held device may connect to different ones of the access points based on, for example, signal strength.

When the device is in the in-store mode, the shopping program generally presents displays relating to or based on the products on the shopping list.

As with the product list, the shopping list may be organized in a variety of ways. For example, the shopping list may be present the products in alphabetical order. As another example, the products on the list may be grouped by product type (e.g., Baked Goods, Dairy, Frozen Foods, Meats, Packaged Goods, Pharmacy, and Produce). As yet another example which is discussed in greater detail below, the products on the shopping list may be presented in an order corresponding to the order in which the products would be found by starting at a particular place in the store (e.g., at the beginning of aisle 1, in the produce section, etc.).

As the shopper shops, products which the shopper puts in his/her shopping cart may be checked off or removed from the shopping list. For example, the shopper may simply touch the listing (graphical and/or text) for that product on the display, thereby causing the listing to disappear from the screen or be identified with an icon or graphic indicating that the product is no longer needed. In other implementations, the hand-held device may be provided with a camera or bar code scanner that can be configured to read a label or bar code on the product, thereby causing the product to be removed from the shopping list.

Other techniques may be used to show that a product on the list has been placed in the shopping cart and the systems and methods described herein are not limited in this respect. For example, instead of removing the listing for the product, the listing can be displayed in a different color or different font or can be "grayed out."

In addition to displaying the shopping list while in the store, the shopping program may be configured to provide other in-store display modes.

By way of example, the program may present one or more displays relating to unavailable products. As mentioned above, upon entering the store, the shopping list may be transmitted to the store's server 704. If any product on the shopping list is for some reason not currently available, in addition to updating the product information for the products on the shopping list as described above, the store's server may send a message about the unavailable product to hand-held device 100. In response to this message, hand-held device 100 may provide a display which allows a user to select from between options for not displaying unavailable products on the shopping list or for making selection(s) of alternate product(s). If the shopper's selections indicate that unavailable products should not be displayed and the shopper makes no alternate product selections, the unavailable products may be automatically added to a subsequent (e.g., next) shopping list for the current store or to a shopping list for a different store.

By way of further example, there may be a display mode for displaying electronic coupons, recipes, recommendations and other promotions to the user. These coupons, recommendations, and promotions may be uniquely customized to a particular user based on the user's shopping list or some other attribute (or attributes) of the user. Thus, for example, if the shopping list includes a box of cereal of a particular brand, the shopper may be notified if a coupon is available for a different size of the same cereal or if there is a special on a similar cereal of a different brand. The shopper may be given an option via a display of the hand-held device to change the shopping list to replace the currently selected cereal product with the cereal of a different size or brand.

The shopper's shopping list may be used to guide the shopper through the store. For example, as noted above, the product database maintained by the in-store server may store data indicative of a product's location within the store. The products contained in the shopper's list may be provided to the server, which can then determine and download to hand-held device 100 information for guiding the shopper through the store so that the products on the list can be easily found.

Figure 9A:
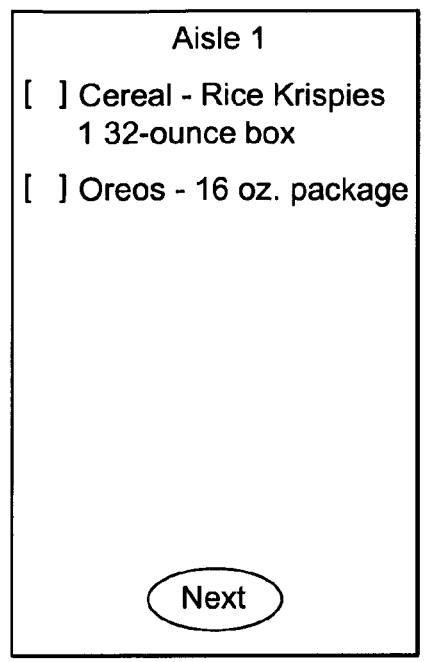
FIGS. 9A and 9B show example screens for guiding a shopper in a store.

For example, the guiding information may associate an aisle number with each product in the shopping list and this information may be presented as text on the display(s) of hand-held device 100. As shown in FIG. 9A, aisle 1 contains the cereal and cookies on the shopper's list. When the shopper is finished in aisle 1, the next button can be touched to show the products on the shopping list which are in aisle 2. After the last aisle, the next button may direct the shopper to the deli area, the produce area, etc. of the store for the products on the list which are in those areas.

Figure 9B:
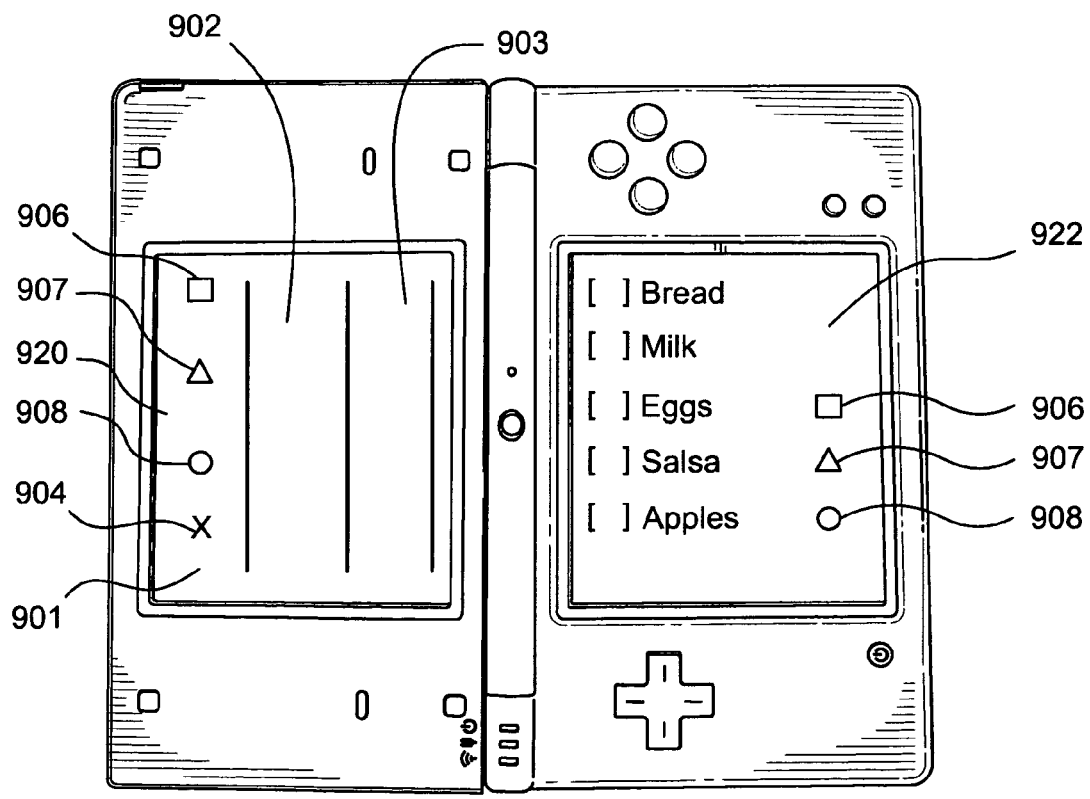

In more sophisticated implementations, the shopper may be guided by combinations of text, graphical and/or video information. For example, using a two-screen hand-held device, a graphical representation of a particular aisle may be shown and the products on the shopper's list which are in this aisle may be identified by highlighting or some other indicia as shown in FIG. 9B. FIG. 9B shows three aisles 901, 902 and 903 on screen 920 and the shopper has touched an area of screen 920 corresponding to aisle 901 to thereby select that aisle. As a result, indicium 904 is provided on screen 920 to visually indicate which aisle has been selected. Upon the selection of aisle 901, icons 906, 907 and 908 are associated with the products on the shopping list (i.e., eggs, salsa and apples) in screen 922. These same icons are used on screen 920 to show where in the aisle the corresponding products may be found.

In still other example implementations, the interior of the store may be shown on the display(s) of hand-held device 100 in a manner akin to Google (registered trademark) Street View and this view may be used to guide the shopper through the store.

The shopper's location in a store may be determined in various ways. For example, the shopper's location may be determined by the products which the shopper checks off the shopping list. For example, as mentioned above, the store's server may maintain a product database storing data indicative of a product's location within the store. This location data may simply be in which aisle the product is located or may provide more detailed information (e.g., which shelf; beginning, middle or end of aisle; etc.) When a shopper checks a product off the shopping list, the shopper's location may be determined based on the location of the checked-off product as determined with reference to the database. Of course, other location-determining techniques may be used (e.g., determining an access point to which a shopper is connected; triangulation; multilateration; trilateration; and the like) and the systems and methods described herein is not limited in this respect.

The information displayed by hand-held device 100 may be based, at least in part, on the shopper's location in the store. For example, if the shopper is currently in the meat section of the store, the hand-held device may display a particular recipe involving some type of meat. If the shopper wants to try the recipe, the shopper supplies an input to this effect to the hand-held device and the ingredients in the recipe are added to the shopping list.

By way of still further example, the hand-held device 100 can be configured to display a map that displays the products on the shopping list in an order that the user will encounter the products in the store assuming, for example, that the user starts shopping in some specified location (e.g., aisle 1 of the store). A map with a route indicator indicates where the user is presently, where the next product is located, what product is required and how much of that product is required. When a product is checked off, the next product is displayed along with guidance to that next product.

If a product is missing from the shelves, a message to this effect may be sent from hand-held device 100 to the store's server by providing an appropriate input thereto (e.g., a particular gesture or selection of a "missing item" menu option). If a product is checked off by the user, the store's server is notified of the probable removal of that product from the shelves. In both cases, this information can be used to track the products on the shelves and whether, for example, re-stocking is needed.

An additional display mode may be implemented in which a map and a target product is displayed on a first portion of the screen and a street view-like display of the shelves with the target product highlighted is displayed on a second portion of the screen. If hand-held device 100 is implemented with two display screens, one of the screens may display the map and the other screen may display the street view-like display.

Figure 6:
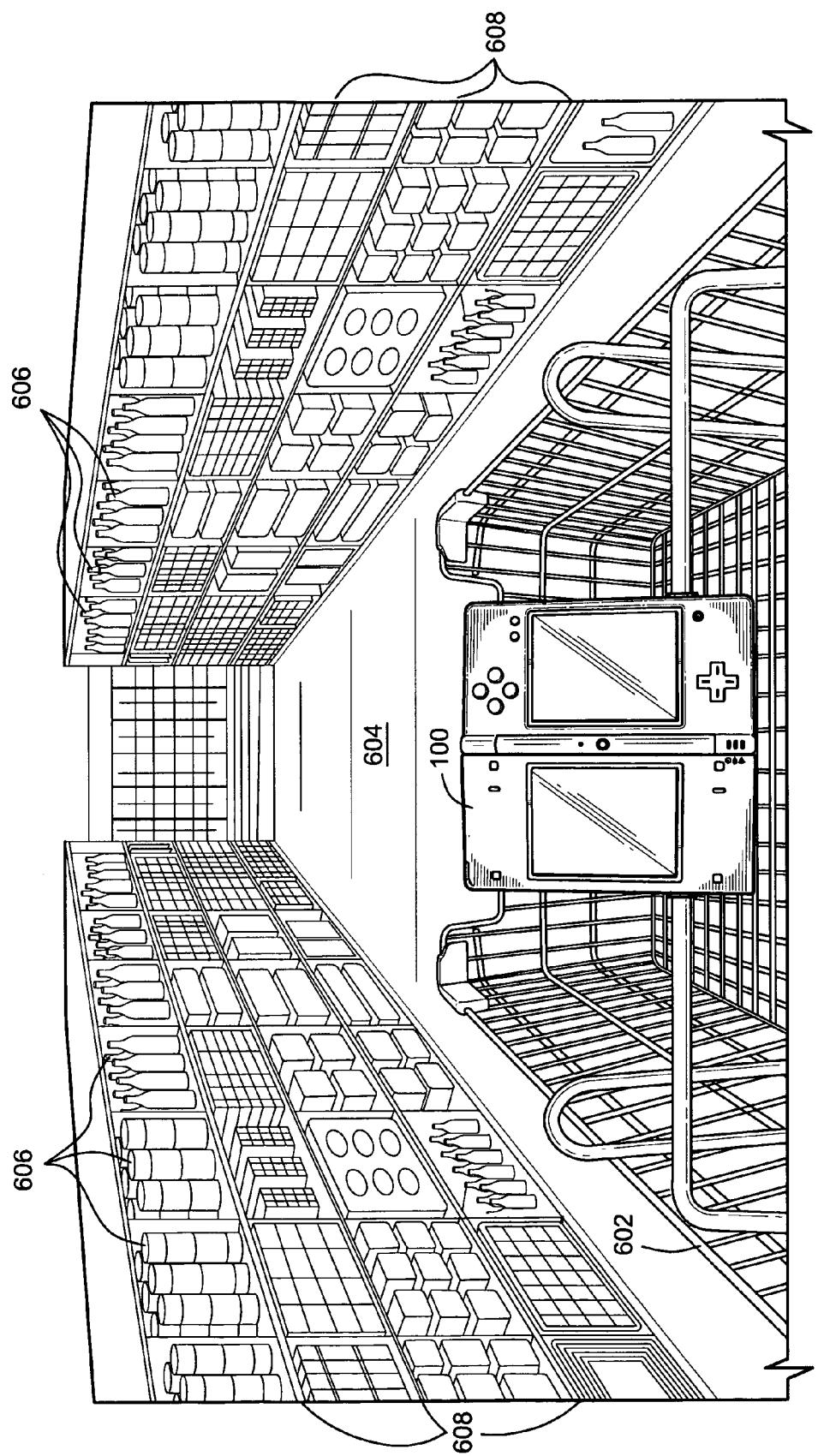
FIG. 6 shows a shopping cart with hand-held device 100 mounted thereon.

FIG. 6 shows shopping cart 602 with hand-held device 100 mounted thereon in a grocery store aisle 604. Various products 606 are contained on the shelves 608 in the aisle. One or both of the displays of the hand-held device may display the shopper's shopping list and, as described above, the shopper may check items off the list as the shopper finds these items in the store and places them in the cart 602. Although FIG. 6 shows hand-held device 100 as being secured to a shopping, the shopper can of course simply carry the hand-held device.

If the store's server indicates that the next product on the shopping list is out of stock, this information is communicated to hand-held device 100 and the display of the device may be controlled to provide the user an option to proceed to the next product without stopping to look for the missing product.

While shopping, a user can look up information about products, check prices or obtain recipes at any time. Hand-held device 100 can also keep a running tally of number of products remaining on the shopping list, total cost of products checked off, total calories of products checked off, and the like.

The shopping mode may also enable a shopper to obtain immediate in-store assistance. For example, one or more screens in the in-store mode may include an Assistance button which the shopper can touch to obtain assistance. Touching the button sends a message to the store's server 704 requesting assistance. The message may include shopper identification information and can also include shopper location information. This information can be sent from server 704 to a customer assistance representative who can find and assist the shopper. In other implementations, assistance can be provided using chat, text, audio and/or video.

The shopping program may also be configured to allow shoppers to interact with each other. For example, shoppers in the store may log into the store's server 704 which may be configured to permit logged-in shoppers to exchange text messages with each other or to post messages to a message board that can be seen by other shoppers. The messages can be exchanged using "screen names" (e.g., "JavaJoe") to avoid revealing personal information to other shoppers.

Messages and recommendations can also be provided to a shopper based at least in part on products in the shopper's shopping list. For example, if a shopper checks a particular brand of pickles off of his/her shopping list, this information can be sent to store's server 704 which can use this information to provide a particular (or customized) message or recommendation. For example, server could send a message to hand-held device 100 stating: "Hey, people who liked brand X pickles also liked brand Y olives." Similarly, a message could be sent when a shopper selects a particular recipe: "Hey, people who liked recipe X also liked recipe Y."

The program can also be configured to allow shoppers to input ratings for some or all products on the product list. This information can be used, for example, by the store in making decisions as to which products and brands to stock.

At check-out, hand-held device 100 is scanned to act as an affinity card. This scan may be performed by a check-out device (e.g., cash register) requesting an identifier from the hand-held device or by optically scanning a bar code or other identifier attached to the hand-held device. This scan can also communicate some or all of the shopping list information to the check-out device so that a display of the check-out device can provide a check-out clerk with information about products on the shopping list that the user did not check off or were not on the shelf to allow for better customer service. The store server can also signal stock runners to deliver any products to the shopper indicated as not on the shelf (but known to be located in the store) or special orders to deliver the products to the check out counter. The runners may be alerted in a variety of ways. For example, an announcement may be made over in-store loudspeakers. In another example, an alert may be provided via an email or instant message sent to mobile telephones or personal digital assistants (PDAs) carried by the runners.

The store server can also inform product stockers to pre-position products at the front of the store for hand delivery to customers at check-out. The store can issue coupons rain checks or other incentives to customers for any items unavailable.

Check-out also includes charging the payment amount (taking into account any discount or paper or electronic coupons, for example) for the groceries to a shopper-designated credit, charge or debit card.

The shopper's input may also be used to provide information about the lack of a product on the shelves. For example, if a product is out-of-stock on the store shelves, the shopper may input an indication to the effect to the information terminal. This information can be used to alert a store manager that a particular product needs to be re-stocked.

The system described herein provides an opportunity for real-time customer relationship management. For example, the hand-held device can allow a shopper to input a request for assistance. The shopper's past purchases can be used to provide personalized suggestions of recipes and products that the shopper is likely to find of interest. Similarly, the shopper can be alerted to specials and coupons for products that the shopper has purchased in the past or for new products.

In addition, the shopper may input certain dietary restrictions that can be used while the shopper is shopping. For example, a shopper may input preferences for low-fat, low-calorie, and low-salt products or may input information about certain allergies (e.g., nut allergies). If the hand-held device is configured with a camera or bar code scanner, the shopper can scan the product to be alerted, for example, if a product has an associated nut warning. In other implementations, the shopper may be alerted to low-fat or low-salt alternatives to a particular product.

This systems and methods described herein allow for unique communication between the shopper and the store by providing both pre-shopping plans of shoppers to the store, detailed store/product information to the shopper and real-time in-store interactions. By providing pre-shopping information to the store, the store can better plan its logistics to better deliver the correct amount of stock to the store. When shoppers enter the store and the shoppers' shopping lists are transmitted to the store's server, the server knows on a short event horizon the likely shelf stock needs. Consequently, stocking plans can be dynamically altered to reduce the likelihood of empty shelves by alerting stockers of a pending run on a product. When a shopper indicates in his/her hand-held device that a product is out of stock, this can immediately send a signal from the store's server to the stocker(s) that an item is out on the shelves for a priority restocking.

The described systems and methods also provide unique profiles of the shopping experience to the hand-held device platform provider, store and/or product manufacturer. Detailed statistics can be generated that include, in addition to the previously listed data: products on a shopping list, but not taken to check-out; products on a shopping list, but for which a substitute item was selected; products missing from a shelf and whether an alternative products was selected; order of products selected in planning mode; order of products selected when shopping; number and products selected for price checks and changes in shopping lists.

When multiple shopping lists are maintained by the shopper, then cross correlation of shopping habits can be analyzed. For example, shoppers may be found to generally purchase certain types of products (e.g., meats) at one store, but not at another store. This information can be used by the other store in considering whether to upgrade its meat selection or quality in order to attract the shoppers that are currently shopping elsewhere for meat.

Special opportunities exist when the shopper maintains respective lists for multiple stores of the same category, such as grocery stores. This allows the hand-held device platform provider to provide to its subscriber stores information about shopper selected items that were not purchased at the subscriber store.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

While the systems and methods have been described in connection various embodiments, it is to be understood that the system and method are not to be limited to the disclosed embodiment, but on the contrary, are intended to cover various modifications and equivalent arrangements.

I claim:

1. A system comprising:
a first display screen;
a second display screen, separated from the first display screen;
a communication circuit;
a memory storing a shopping program; and
at least one processor in communication with the first and second display screens, the communication circuit and the memory and being configured to execute the shopping program to perform functionality comprising:
accessing a product database including product information,
processing inputs supplied to the system to generate a shopping list comprising one or more products from the product database,
determining a location associated with a most recently selected product, and
generating guidance information on at least one display screen relating to product location in a store of products on the shopping list based at least in part on the determined location of the most recently selected product,
wherein the guidance information is displayed on the first display screen and the generated shopping list is displayed on the second display screen, the shopping list comprising one or more objects that are displayed on the second display screen in association with the items on the shopping list, and the first display screen displaying the corresponding location of the items, using the guidance information, by displaying the object associated with the item at a position indicating the location where the item can be found.

2. The system according to claim 1, wherein the guidance information comprises a map.

3. The system according to claim 2, wherein the map comprises a map displaying one or more store aisles and indicia indicative of products on the shopping list present in the aisles.

4. The system according to claim 1, wherein the system is embodied in a hand-held device.

5. The system according to claim 1, wherein the system is embodied as a mobile telephone.

6. The system according to claim 1, wherein the inputs comprises touches on a touch screen.

7. The system according to claim 1, wherein the inputs comprise gestures on a touch screen.

8. The system according to claim 1, wherein the communication circuit comprises a wireless communication circuit.

9. A system comprising:
a first display screen;
a second display screen, separated from the first display screen;
a memory storing a shopping list program;
a radio frequency identification (RFID) reader; and
at least one processor in communication with the first and second display screens, the memory and the RFID reader and being configured to execute the shopping list program to perform functionality comprising:

transmitting RFID interrogation signals using the RFID reader, receiving responses to the RFID interrogation signals, processing the responses to generate at least a partial shopping list for output on the first or second display screen; and generating guidance information on at least one display screen relating to product location in a store of products on the shopping list, wherein the guidance information is displayed on the first display screen and the generated shopping list is displayed on the second display screen, the shopping list comprising one or more objects that are displayed on the second display screen in association with the items on the shopping list, and the first display screen displaying the corresponding location of the items, using the guidance information, by displaying the object associated with the item at a position indicating the location where the item can be found.

10. The system according to claim 1, wherein the at least one processor further executes the shopping program to suggest to add items to the shopping list when a product in a home inventory is about to expire or when the product is almost depleted from the home inventory.

11. The system according to claim 9, wherein the at least one processor further executes the shopping program to suggest to add items to the shopping list when a product in a home inventory is about to expire or when the product is almost depleted from the home inventory.

12. A non-transitory computer readable storage medium for storing a shopping program executed in a shopping system having a first display screen and a second display screen, separated from the first display screen, the shopping program comprising:

accessing a product database including product information;

processing inputs supplied to the system to generate a shopping list comprising one or more products from the product database;

determining a location associated with a most recently selected product; and generating guidance information on at least one display screen relating to product location in a store of products on the shopping list based at least in part on the determined location of the most recently selected product, wherein the guidance information is displayed on the first display screen and the generated shopping list is displayed on the second display screen, the shopping list comprising one or more objects that are displayed on the second display screen in association with the items on the shopping list, and the first display screen displaying the corresponding location of the items, using the guidance information, by displaying the object associated with the item at a position indicating the location where the item can be found.

13. A non-transitory computer readable storage medium for storing a shopping program executed in a shopping system having a first display screen and a second display screen, the shopping program comprising:

transmitting RFID interrogation signals using an RFID reader;

receiving responses to the RFID interrogation signals; and processing the responses to generate at least a partial shopping list for output on the first or second display screens; and generating guidance information on at least one display screen relating to product location in a store of products on the shopping list, wherein the guidance information is displayed on the first display screen and the generated shopping list is displayed on the second display screen, the shopping list comprising one or more objects that are displayed on the second display screen in association with the items on the shopping list, and the first display screen displaying the corresponding location of the items, using the guidance information, by displaying the object associated with the item at a position indicating the location where the item can be found.

* * * * *